United States Patent [19]

Despres

[11] Patent Number: 4,749,847

[45] Date of Patent: Jun. 7, 1988

[54] METHOD AND DEVICE FOR IDENTIFYING A VALUABLE OBJECT

[76] Inventor: Jean-Albert Despres, 7 rue Berryer, 75008 Paris, France

[21] Appl. No.: 830,666

[22] Filed: Feb. 18, 1986

[30] Foreign Application Priority Data

Feb. 21, 1985 [FR] France ................... 85 02528

[51] Int. Cl.⁴ .............................................. H04Q 3/00
[52] U.S. Cl. ................................ 235/487; 235/375; 235/382
[58] Field of Search .................. 235/487, 375, 382

[56] References Cited

U.S. PATENT DOCUMENTS

| | | |
|---|---|---|
| 4,025,759 | 5/1977 | Scheffel . |
| 4,271,352 | 6/1981 | Thomas . |
| 4,317,287 | 3/1982 | Sausele . |
| 4,436,993 | 3/1984 | Flies ........................... 235/382 |
| 4,592,893 | 6/1986 | Poppe .......................... 235/375 |
| 4,613,942 | 9/1986 | Chen ........................... 235/375 |

*Primary Examiner*—Harold I. Pitts
*Attorney, Agent, or Firm*—Kenyon & Kenyon

[57] ABSTRACT

The present invention essentially relates to a method for identifying a valuable object such as for example an object d'art or like work, product or object of artistic value, consisting in incorporating in an invisible manner into the said object an element provided with a code, wherein the information corresponding to the code on the element is centralized in a computer with an associated file allowing the object to be identified with certainty.

2 Claims, 1 Drawing Sheet

METHOD AND DEVICE FOR IDENTIFYING A VALUABLE OBJECT

BACKGROUND OF THE INVENTION

1. Field of the Invention

The present invention has essentially for a subject matter a method for identifying a valuable object, such as for example an objet d'art or like work or product of artistic value.

It is also directed to a device for carrying out the said method.

It is essential, nowadays, that valuable objects such as for example ancient or early pieces of furniture, paintings, or pieces of jewelry, be identifiable completely and with certainty. Indeed, such objects may, as is readily understood, be lost, stolen, or faked, and it is therefore of primary importance that such objects be identifiable extremely definitely and completely to allow their origin or their authenticity to be proved conclusively.

2. Description of the Related Art

In this respect, it has already been proposed to insert invisibly in a valuable object an element bearing either plain or coded information apt to identify the object concerned. However, such means do not allow gathering from the object the secret and complete information which is absolutely necessary for conclusively proving the origin of the object.

SUMMARY OF THE INVENTION

The present invention therefore has as its purpose to remedy particularly the above drawbacks by providing a method and a device for identifying a valuable object, allowing the identity of its owner and its characteristics to be established incontestably.

To this end, the invention relates to a method for identifying any valuable object, such as for example an objet d'art or like work or product of artistic value, consisting in incorporating in an invisible manner in the said object an element bearing a code, characterized in that the information corresponding to the code on the element is centralized in a computer with a file, which allow identifying the object with certainty.

According to another feature of the method of the invention, the said element is provided with a code representing preferably the letters of the alphabet and/or numerals.

The invention is also directed to a device for identifying a valuable object, for the carrying out of the method characterized by the above features, and of the type including an element insertable into the object and bearing a code consisting of notches or the like readable by a suitable reading system, characterized by a computer establishing the relationship between the shape of each notch and the information corresponding thereto, and by a file containing at least one record bearing the information relating to the object and identifiable by the computer according to the information obtained from the notches.

It is thus understood that the computer constitutes in a way a "secret key" allowing the person holding it —and that person alone—to check whether the notches on the element inserted in the object correspond to the record or records bearing all the necessary information on the object, such as for example the identity of the owner of the object, its characteristics and, possibly, photographs thereof, as also the exact location of the element inserted in the object.

According to another feature of the device of the invention, the notches on the said element each include flat and/or arcuate portions, the combination of which represents for example a letter of the alphabet and/or a numeral.

BRIEF DESCRIPTION OF THE DRAWING

Other features and advantages of the invention will appear more clearly as the following description proceeds with reference to the appended drawings given solely by way of example and wherein.

DESCRIPTION OF THE PREFERRED EMBODIMENTS

According to one example of embodiment and referring to the appended drawings, an identification device complying with the principles of the invention includes essentially an element 1 bearing a code and insertable in an invisible manner into any valuable object (not shown), a system L of means for reading or deciphering the element, and a computer O with an associated file F in which is centralized all the information corresponding to the code of the element 1, i.e., all the information concerning the valuable object containing the said element.

Figure 1:
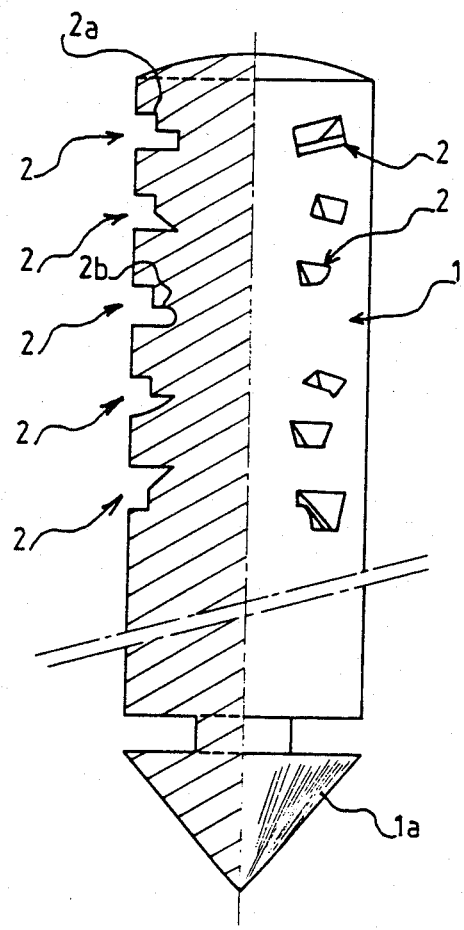
FIG. 1 is a partial and enlarged elevational view (external half-view and sectional half-view) of an element or insert intended to be incorporated in an invisible manner into an object of artistic value.

As seen in FIG. 1, the element or insert 1 may be in the form of a cylinder 1 provided with a point for its insertion into a valuable object, it being understood that the latter may be predrilled to receive the code-bearing element 1. The element 1 may thereafter be secured to the object by means of, for example, a strongly adhesive material, and, in any case, it is sunk in the object so as not to be visually detectable.

On the element 1 are provided notches or the like 2 obtained by any suitable means and constituting a code corresponding to information about the object in which the element 1 is incorporated.

In a preferred form of embodiment, each notch 2 is constituted by a plurality of flat and/or arcuate portions. Referring to FIG. 1, it is seen for example that the notch 2a displays a plurality of flat portions, whereas the notch 2b consists of flat portions and a curvilinear portion. The notches 2 may or may not extend in a perpendicular direction to the axis of the element 1 and each have a particular form depending on the meaning which it is desired to assign to it.

According to a preferred form of embodiment, the notches 2 each represent a letter of the alphabet, or a numeral, or both.

The cylindrical element 1 is made of a suitable metal allowing the detection or locating of the said element by any suitable reading means. For example, the element 1 may be detected by means of X-rays or by ultrasound echoing.

Figure 2:
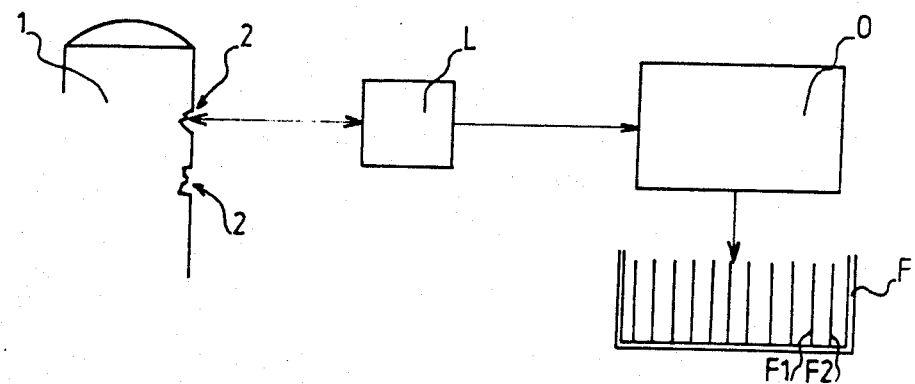
FIG. 2 is a diagram illustrating the essential means used in the invention.

As appears from FIG. 2, the notches 2 of the element 1 may be read by an appropriate system L of reading means. Such reading may be performed for example on a valuable object offered for sale and of which it is desired to check the authenticity. The reading by X-rays or by echoing once performed, the information corresponding to the code of the element 1 are deciphered by a computer O with an associated file F which of course will be kept in a place presenting all the desirable secrecy safeguards.

More precisely, the central computer O establishes the correlation between the shape of each notch 2 and the information (e.g. a letter of the alphabet) corresponding thereto, and transmits to the file F the command for obtaining the record or records F1, F2, etc, plainly and thoroughly identifying the valuable object provided with the element 1.

It is thus understood that the advantage of such a system lies essentially in the centralization in a central file of data relating to a very large number of valuable objects, it being understood that such a central file must be accessible only to duly authorized persons.

The records F1, F2, ..., Fn of the central file F may of course contain all the necessary information concerning the owner, the origin or the characteristics of the valuable object. Of course, the computer must be apt to receive all the insertion writings and to process all the documents represented by such insertions, it being understood that it must also take charge of all subscribers' orders, e.g. in case the valuable object is subjected to a mutation necessating the introduction of modifications or of complements into the central file.

There are therefore obtained according to the invention a method and a device for identifying valuable objects allowing the origin or authenticity of such objects to be proved with absolute certainty.

Of course, the invention is by no means limited to the form of embodiment described and illustrated, which has been given by way of example only.

For instance, the shape, material and dimensions of the element insertable into the object, as also the cutting of notches in the element, may be selected as desired without departing from the scope of the invention. The notches 2 may present portions which are more or less deep and extend in various directions with respect to the axis of the element.

Likewise, the computer and the associated file may be placed or arranged in any desired manner, the essential requirement being that the record or records bearing the complete information on the object concerned be identifiable by the computer according to the information obtained from the notches of the element insertable into the said object.

The invention therefore includes all technical equivalents to the means described as well as their combinations if the latter are carried out according to its gist.

What is claimed is:

1. A device for identifying a valuable object such as an object of artistic value, comprising an element incorporated in an invisible manner into said object and carrying coded identification data thereon, in form of at least one notch or the like made in said element, reading means for reading said coded data, such as an X-ray or ultrasound reader device, memory means containing information concerning said object, such as a central file of data, and computer means adapted to establish the correlation between the read identification data and the information contained in said memory means, said at least one notch having a specific shape constituting the code of an analog value such as an alphabetic character or a numeral.

2. A device for identifying a valuable object such as an object of artistic value, comprising an element incorporated in an invisible manner into said object and carrying coded identification data thereon, in form of at least one notch or the like made in said element, reading means for reading said coded data, such as an X-ray or ultrasound reader device, memory means containing information concerning said object, such as a central file of data, and computer means adapted to establish the correlation between the read identification data and the information contained in said memory means, said at least one notch having a specific shape constituting the code of an analog value such as an alphabetic character or a numeral, each said notch including flat and/or arcuate portions the combination of which constitutes the code of one of said analog values.

* * * * *